(12) United States Patent
Kolavennu et al.

(10) Patent No.: US 9,472,205 B2
(45) Date of Patent: Oct. 18, 2016

(54) DEVICE VOICE RECOGNITION SYSTEMS AND METHODS

(71) Applicant: Honeywell International Inc., Morristown, NJ (US)

(72) Inventors: Soumitri N. Kolavennu, Blaine, MN (US); Aravind Padmanabhan, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 318 days.

(21) Appl. No.: 13/888,053

(22) Filed: May 6, 2013

(65) Prior Publication Data

US 2014/0330569 A1    Nov. 6, 2014

(51) Int. Cl.
| | | |
|---|---|---|
| *G10L 21/00* | (2013.01) | |
| *G10L 21/16* | (2013.01) | |
| *G10L 15/18* | (2013.01) | |
| *G10L 15/22* | (2006.01) | |
| *G10L 15/30* | (2013.01) | |
| *H04L 12/28* | (2006.01) | |

(52) U.S. Cl.
CPC ........... *G10L 21/16* (2013.01); *G10L 15/1815* (2013.01); *G10L 15/22* (2013.01); *H04L 12/282* (2013.01); *G10L 15/30* (2013.01); *G10L 2015/223* (2013.01); *H04L 12/2803* (2013.01); *H04L 12/2821* (2013.01)

(58) Field of Classification Search
CPC ........... H04L 12/2803; H04L 12/2816; H04L 12/2818; H04L 12/282; H04L 12/2821; G10L 15/1807; G10L 15/1815; G10L 15/1822; G10L 15/183; G10L 15/187; G10L 15/19; G10L 15/197; G10L 15/22; G10L 15/223; G10L 15/225; G10L 15/226; G10L 15/227; G10L 15/228
See application file for complete search history.

(56) References Cited

U.S. PATENT DOCUMENTS

| | | | | |
|---|---|---|---|---|
| 6,052,666 | A * | 4/2000 | Diehl et al. .................... | 704/275 |
| 6,408,272 | B1 * | 6/2002 | White et al. ................ | 704/270.1 |
| 7,447,635 | B1 * | 11/2008 | Konopka et al. ............. | 704/275 |
| 7,957,974 | B2 * | 6/2011 | Cho ...................... | H04L 12/282 |
| | | | | 704/270 |
| 8,340,975 | B1 * | 12/2012 | Rosenberger ................. | 704/275 |
| 8,396,710 | B2 * | 3/2013 | White et al. .................. | 704/244 |
| 8,831,957 | B2 * | 9/2014 | Taubman et al. ............. | 704/275 |
| 2002/0069063 | A1 * | 6/2002 | Buchner et al. .............. | 704/270 |
| 2003/0187659 | A1 * | 10/2003 | Cho ...................... | H04L 12/282 |
| | | | | 704/275 |
| 2007/0288129 | A1 | 12/2007 | Komer et al. | |
| 2008/0147397 | A1 * | 6/2008 | Konig ..................... | G10L 21/02 |
| | | | | 704/246 |
| 2010/0286985 | A1 | 11/2010 | Kennewick et al. | |
| 2012/0232886 | A1 * | 9/2012 | Capuozzo ........... | H04L 12/2814 |
| | | | | 704/9 |

(Continued)

FOREIGN PATENT DOCUMENTS

EP        0986808        3/2000

OTHER PUBLICATIONS

EP Search Report related to EP Application 14165437.6 dated Aug. 7, 2014 (3 pages).

*Primary Examiner* — Richard Zhu
(74) *Attorney, Agent, or Firm* — Brooks, Cameron & Huebsch, PLLC

(57) ABSTRACT

Device voice recognition systems and methods are described herein. One example of a method for device voice recognition includes receiving a voice command, determining a number of devices relating to the voice command, and adjusting a setting of the number of devices based on the received voice command.

20 Claims, 4 Drawing Sheets

(56) References Cited

U.S. PATENT DOCUMENTS

2014/0223465 A1\* 8/2014 Hatambeiki ..... H04N 21/44204 725/14

2015/0088518 A1\* 3/2015 Kim ........................ G06F 3/167 704/251

\* cited by examiner

DEVICE VOICE RECOGNITION SYSTEMS AND METHODS

TECHNICAL FIELD

The present disclosure relates to device voice recognition systems and methods.

BACKGROUND

Voice recognition systems can be used to convert voice commands to text data. The converted voice commands can be used in a variety of ways with a device similar to inserting the text with the device. The text that is converted from the voice commands can be used in an Internet search engine similar to the user entering text data into the search engine.

DETAILED DESCRIPTION

Figure 1A:
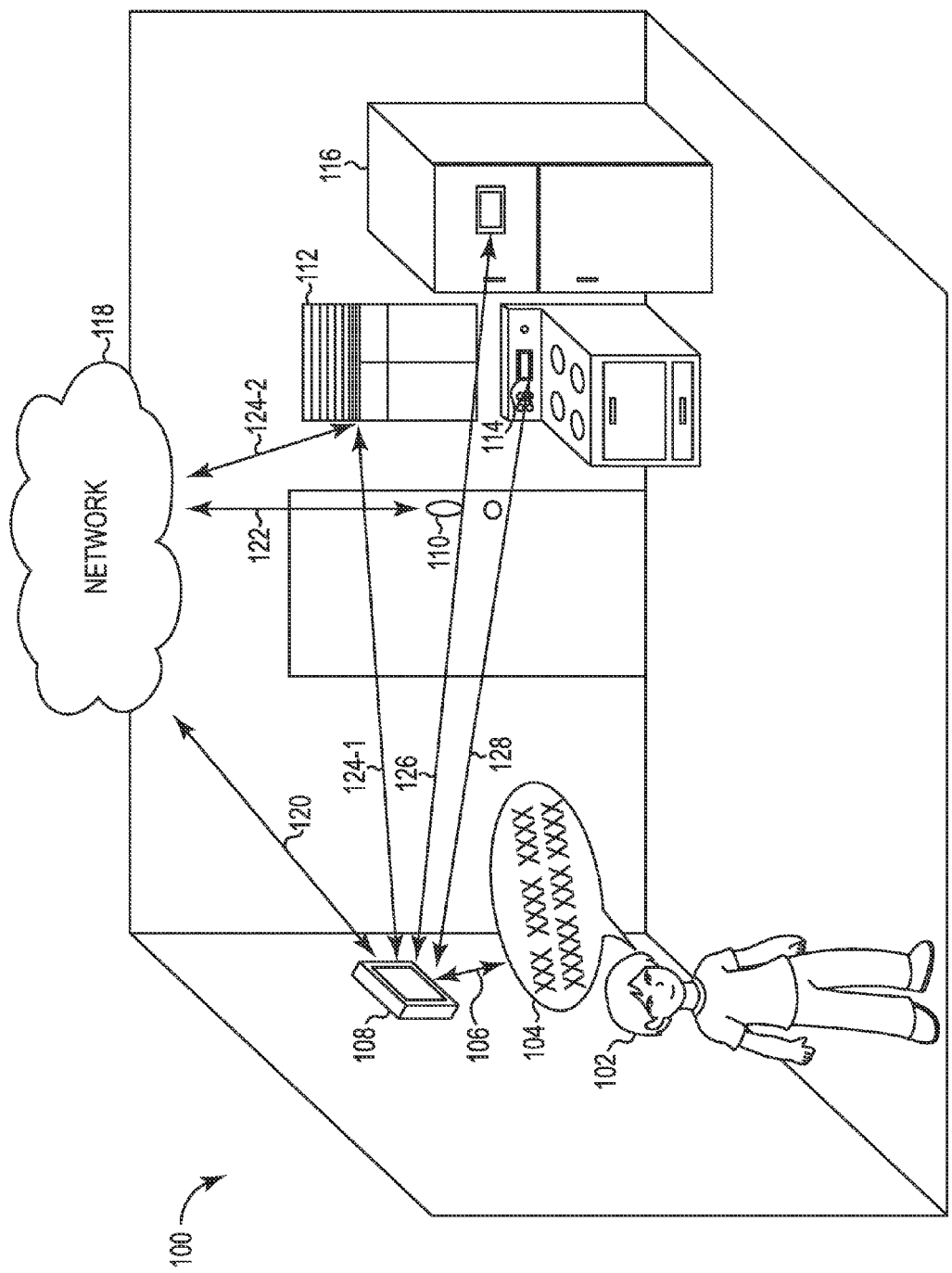
FIG. 1A illustrates an example of a device voice recognition environment in accordance with one or more embodiments of the present disclosure.

Device voice recognition systems and methods can include receiving a voice command, determining a number of devices relating to the voice command, and adjusting a setting of the number of devices based on the received voice command. The voice command can include vocal instructions (e.g., spoken instruction, speech instructions, sounds from a user, etc.) from a user (e.g., human user, etc.). For example, a user can speak a voice command within a particular distance of a computing device and the computing device can receive the voice command from the user.

The computing device can convert the received voice command to text data (e.g., natural language text message, text data of the voice command, text data of the speech, etc.). The computing device can also send the received voice command to a wireless network (e.g., cloud computing system, server, etc.) to convert the voice command to a natural language text message.

The computing device can be in communication (e.g., connected, connected to a cloud server, communicatively coupled, etc.) with a number of devices (e.g., electronic devices, thermostat, door locks, blinds on a window, stove, refrigerator, pool pump, lights). The computing device can be a separate device and/or incorporated (e.g., within, hard wired, directly connected) with each of the number of devices.

The voice command can correspond to a setting change for the number of devices. For example, the voice command can correspond to changing a thermostat setting (e.g., lowering the temperature setting of the thermostat). The setting change can also be a setting change for a plurality of devices from the number of devices. For example, the voice command can correspond to turning off a plurality of lights. The setting change can also be a different setting change for each of the number of devices. For example, the voice command can correspond to a plurality of lights being turned off, the temperature of the thermostat being lowered, and the door being locked.

The voice command can be directed to a number of devices and include a corresponding number of setting changes. In some examples, the voice command can be directed to an intention (e.g., desired setting of multiple devices, mood of the user, etc.) of the user instead of instructing an individual device. For example, the voice command can be directed to a user's intention of leaving a room. In this example, the voice command can be "leaving the room" and the corresponding setting changes to the number of devices can include, but are not limited to: shutting off a number of lights, turning down the temperature of a thermostat, turning off a number of other electronic devices.

Utilizing the device voice recognition as described herein, a user can interact with surrounding electronic devices by giving a vocal command of an intention of the user.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of devices" can refer to one or more devices.

FIG. 1A illustrates an example of a device voice recognition environment 100 in accordance with one or more embodiments of the present disclosure. The device recognition environment 100 can include a user 102 giving (e.g., speaking, etc.) a voice command 104. For example, the voice command 104 can be delivered by the user 102 within a predetermined distance 106 and directed to a hub 108. The hub 108 can be a thermostat and/or security system that can receive voice commands 104 and can include a display (e.g., display screen, touch screen, etc.).

Figure 3:
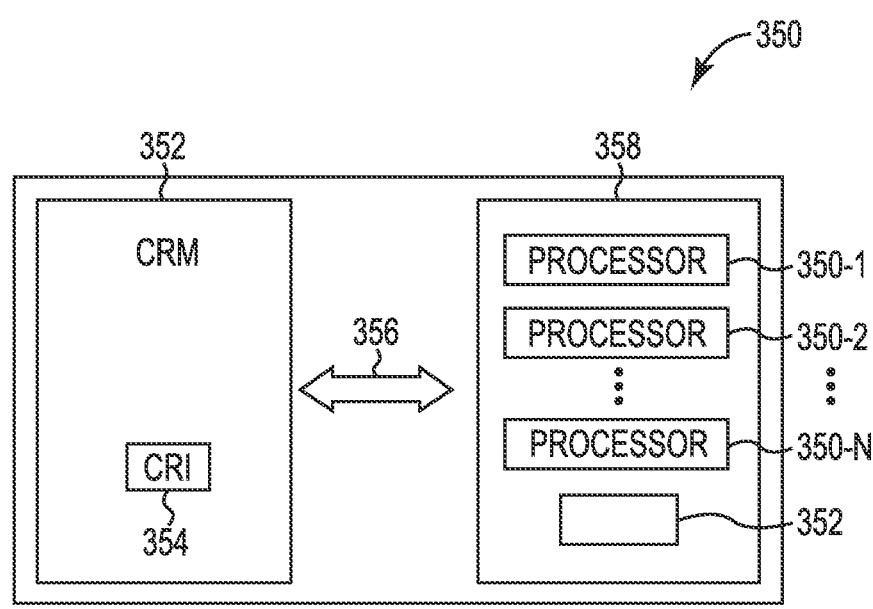
FIG. 3 illustrates a block diagram of an example of a computing device in accordance with one or more embodiments of the present disclosure.

The hub 108 can include a computing device (e.g., computer, wireless communication device, computing device 350 as referred to in FIG. 3, etc.). The computing device can be used to convert the voice command 104 into text data (e.g., natural language text data, etc.). The computing device can use various methods of voice-to-text conversion.

The hub 108 can also send the received voice command to a network 118 (e.g., cloud network, server, network manager, etc.) to convert the voice command 104 to text data. For example, the hub 108 can receive a voice command 104 from the user 102 and send the voice command 104 via communication path 120 to be converted to text data utilizing the network 118. The network 118 can be utilized to convert the voice command 104 to text data and return the text data and/or instructions (e.g., computer readable instructions (CRI), etc.) to the hub 108 via communication path 120. Sending the voice command 104 to the network 118 for converting the voice command 104 to text data can provide additional bandwidth to the environment 100. For example, sending the voice command 104 to the network 118 for converting the voice command 104 to text data can provide functionality of converting the voice command 104 to text data to the hub 108 without additional hardware.

The text data, whether converted at the hub 108 or converted by the network 118, can include instructions for changing a setting of the hub 108 that corresponds to the voice command 104. For example, the text data can include instructions (e.g., CRI) for lowering a temperature. In this example, the hub 108 can change the temperature setting of a thermostat to a lower temperature setting. In the example, the voice command 104 received by the hub 108 is to instruct a change of a setting on the hub 108.

The text data can also include instructions for changing a setting of a device (e.g., device other than hub 108, etc.) in communication (e.g., includes a communication path, etc.) with the hub 108. For example, the voice command 104 can be converted to text data via the hub 108 or by the network 118. In this example, the text data can include instructions to change a setting on a refrigerator 116 (e.g., temperature setting, water shut off, etc.). The instructions to change the setting on the refrigerator can be sent to the refrigerator via communication path 126.

A computing device within the refrigerator 116 can enable the refrigerator 116 to receive the instruction from the hub 108 and to execute the instructions to change the setting. In a similar example, the text data can include instructions to change a setting on a stove 114 (e.g., gas shutoff, power shutoff, etc.). The instructions can be sent to the stove 114 via communication path 128 to change the setting on the stove 114. In these examples communication path 126 and communication path 116 can include, but are not limited to Bluetooth, near field communication (NFC), WIFI, Ethernet, radio frequency, etc.

The text data can also include instructions for changing a setting of a device that is also in communication with the network 118. For example, the voice command 104 can be directed to the hub 108. In this example, the hub 108 can send the voice command 104 to the network 118 to be converted to text data. The network 118 can determine a device to send the instructions based on the converted text data. For example, the voice command 104 can be converted to text data by the network 118 and include instructions for changing a lock setting of a door lock 110. In this example, the voice command 104 can be "lock the door" and the voice command 104 can be sent to the network 118. In the same example, the network 118 can determine an instruction for changing the lock setting to "lock" can be sent to the door lock 110 via communication path 122. In this example, the hub 108 may not have a direct communication path to the door lock 110 other than through the network 118.

The text data can also include instructions for changing a setting of a device that is in communication with both the network 118 and the hub 108. When a device is in communication with the network 118 and the hub 108 the voice command 104 can be directed to a number of different devices. For example, the voice command 104 can be directed to the window shades 112. In this example, the window shades 112 can receive the voice command 104 and transfer the voice command to either the hub 108 via communication path 124-1 or the network 118 via communication path 124-2. The voice command 104 can be converted to text data as described herein. If the text data includes instructions to change a setting of the window shades 112 (e.g., shades down, shades up, etc.), the text data and/or instructions can be sent back to the window shades 112. The instructions can then be executed by the window shades 112.

The voice command 104 can be directed to a first device and the first device can send the voice command 104 to either the network 118 and/or the hub 108 to be converted to text data. The text data can include instructions to change settings on a second device. For example, the voice command 104 can be directed to the window shades 112 and the window shades 112 can send the voice command 104 to hub 108. The voice command 104 can be converted to text data as described herein. In this example, the voice command 104 can relate to changing a setting of the refrigerator 116. The hub 108 can send the text data and instructions for the setting change to the refrigerator 116 to change the setting based on the voice command 104. Each of the devices (e.g., hub 108, window shades 112, refrigerator 116, etc.) can include a computing device to receive a voice command and/or convert the voice command to text data.

The voice command 104 can be directed to a single device and can be converted to include instructions for multiple other devices (e.g., refrigerator 116, stove 114, window shades 112, etc.). The voice command 104 can be a general description of a user intention and a number of devices can be sent instructions to change a setting. For example, the voice command 104 of "leaving the house" can be directed to the hub 108. In this example, the voice command 104 can be converted to text data and an instruction can be sent to the window shades 112 to close the window shades 112. In addition, an instruction can be sent to the door lock 110 to lock the door and an instruction can be sent to a security system within the hub 108 to set an alarm of a security system.

The hub 108 and/or other devices within the environment 100 can be programmed to send instructions for the multiple devices upon a single voice command 104. For example, a voice command 104 of "leaving town" can correspond to setting changes for multiple devices. In this example, the voice command 104 "leaving town" can have a predetermined setting change for devices such as a thermostat, security system, hot water heater, door locks, refrigerator, among other devices. In this example, the voice command 104 "leaving town" can include predetermined setting changes to lower energy consumption of a number of devices of various device types (e.g., appliances, security system, heating system, cooling system, door locks, etc.).

The environment 100 can also be utilized to describe a user's experience (e.g., "user feels cold", "user feels warm", etc.) with a voice command 104. The voice command 104 can be converted to text data and instructions can be sent to a number of devices to change settings that correspond to the voice command. For example, the voice command 104 can be "user feels warm" which can correspond to the thermostat temperature being lowered and the window shades 112 can be lowered.

The user 102 is capable of directing voice commands 104 to the hub 108 and/or a different device capable of receiving the voice commands 104 that include an instruction to change a setting of a device and/or a plurality of devices. The user 102 can change the setting of the devices individually and/or change the setting of a plurality of devices by describing a user experience (e.g., feeling cold, feeling warm, etc.) or user intention (e.g., leaving town, leaving the house, etc.).

Figure 1B:
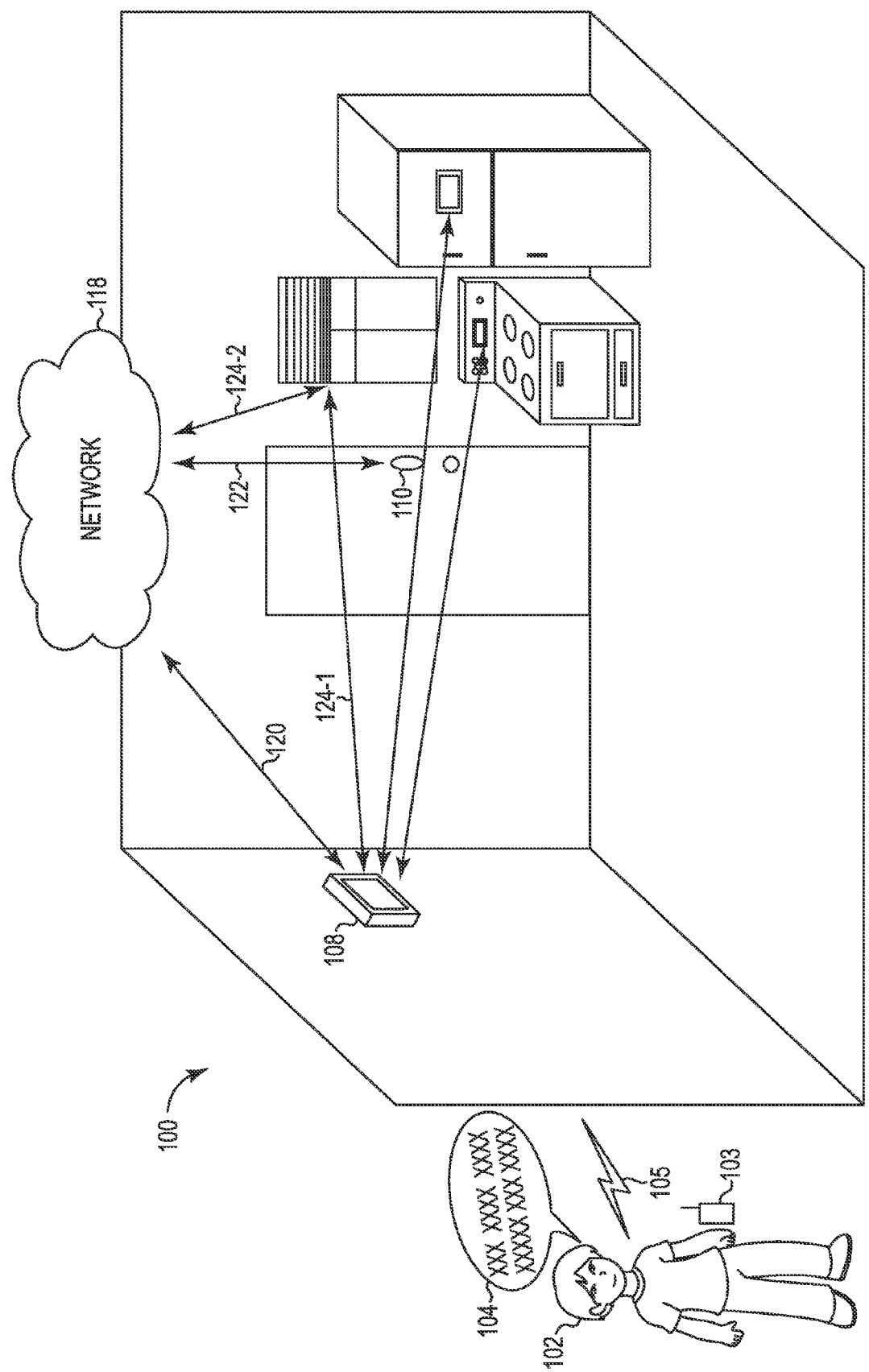
FIG. 1B illustrates an example of a device voice recognition environment in accordance with one or more embodiments of the present disclosure.

FIG. 1B illustrates an example of a device voice recognition environment 100 in accordance with one or more embodiments of the present disclosure. The environment 100 illustrated in FIG. 1B can have the same and/or similar plurality of devices as environment 100 illustrated in FIG. 1A.

In FIG. 1B the user 102 can be at a location that outside the predetermined distance (e.g., predetermined distance 106 illustrated in FIG. 1A). For example, the user 102 can be at a different location (e.g., outside, different geological location, etc.) than the plurality of devices (e.g., hub 108, door lock 110, window shades 112, etc.). The user can utilize a mobile device 103 to direct commands 104 to the plurality of devices via communication path 105 (e.g., wireless signal, global system for mobile communications (GSM), Wi-Fi, Bluetooth, etc.) when the user 102 is located at a different location (e.g., outside predetermined distance 106, etc.).

The user 102 can be capable of utilizing a mobile device (e.g., cell phone, smartphone, personal digital assistant, laptop, etc.) to direct voice commands 104. For example, the user 102 can be at a location outside the environment (e.g., different location, outside the building, etc.) and utilize a cell phone to give a voice command 104.

The mobile device can send the voice command 104 to one of the plurality of devices. For example, the mobile device can send the voice command 104 to the hub 108. In this example, the hub 108 can analyze the received voice command as described herein. As described herein, the hub 108 can send instructions to directly to one of the plurality of devices (e.g., window shades 112) via communication path 124-1. In addition, the hub 108 can send instructions to a network 118 and the network via communication path 120. The network can be utilized to transfer the instructions to a device (e.g., window shades) via communication path 124-2.

The mobile device 103 can send the voice command 104 to the network 118 via communication path 105. The voice command 104 can be transferred from the network 118 to a device (e.g., door lock 110) via communication path 122. The mobile device 103 can also send the voice command 104 directly to one of the plurality of devices. For example, the mobile device 103 can send the voice command 104 directly to the refrigerator 116 via communication path 105.

The functionality (e.g., sending instructions, converting the voice command 104 to natural text, etc.) of the hub 108, as described herein, can be distributed between a number of different computing devices. For example, the functionality can be distributed between the hub 108, the mobile device 103, the network 118, and/or the plurality of devices (e.g., stove 114, window shades 112, door lock 110, refrigerator 116, etc.). In this example, receiving the voice command 104 can be performed by the mobile device 103. In addition, converting the voice command 104 to natural text can be performed by the hub 108. Furthermore, sending an instruction to the plurality of devices can be performed utilizing the network 118.

Figure 2:
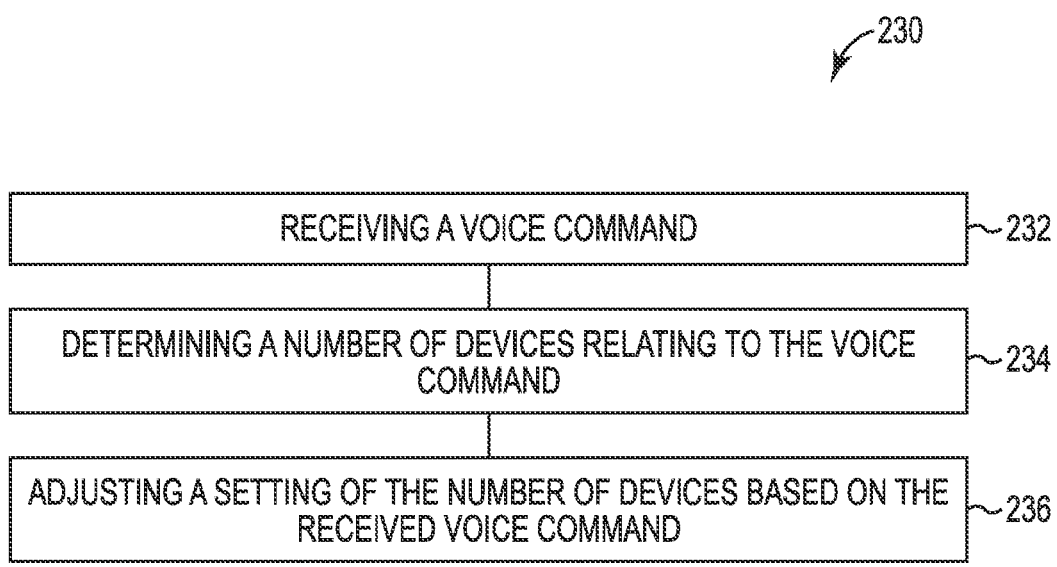
FIG. 2 illustrates an example method for device voice recognition in accordance with one or more embodiments of the present disclosure.

FIG. 2 illustrates an example method 230 for device voice recognition in accordance with one or more embodiments of the present disclosure. The method 230 can be utilized to change settings for a number of devices within a building or area by a voice command. The voice command can be a spoken instruction to a hub and/or computing device and the computing device can send instructions to a number of devices to change a setting on the number of devices.

At box 232 the method 230 can include receiving a voice command. Receiving a voice command can include a computing device receiving a voice command from a user utilizing a microphone and/or a device to receive sound. The voice command can be recorded (e.g., stored in memory, etc.) by the computing device. The voice command can be converted to text data as described herein. The text data can include instructions for changing and/or altering settings for a number of devices. The number of devices can include various electronic devices including, but not limited to: thermostat, security system, door lock, refrigerator, pool pump, lights, computers, stove, and hot water heater, among other electronic devices.

At box 234 the method 230 can include determining a number of devices relating to the voice command. Determining the number of devices relating to the voice command can include determining the number of devices that correspond to the voice command. For example, a voice command of "leaving town" can correspond to devices that include: security system, thermostat, water heater, lights, among other devices. In this example, each of the number of devices can change a setting to conserve energy when the user leaves.

Each of the number of devices can be in communication with a network controller (e.g., network 118 as referenced in FIG. 1, server, cloud network, etc.). For example, each of the number of devices can be connected to a cloud computing network. In this example, the voice command can be sent to the cloud computing network for converting the voice command to text data and instructions for each of the number of devices.

Each of the number of devices can be in communication with a hub (e.g., hub 108 referenced in FIG. 1, digital thermostat, security system display, etc.). For example, a plurality of devices can be in communication with a hub and each of the plurality of devices can send and receive communication from the hub. In this example, the voice command can be converted to text at the hub and the hub can send instructions to each of the devices to change a setting at each of the devices.

At box 236 the method 230 can include adjusting a setting of the number of devices based on the received voice command. Adjusting the setting of the number of devices can include changing a setting of the number of devices. For example, instructions can be sent to each of the number of devices to change and/or adjust the setting of a number of devices. In this example, the instructions can be executed by the receiving device and change and/or adjust the setting utilizing the received instructions.

The setting of the number of devices can include a functional setting on a number of electronic devices. For example, the setting can include, but is not to: turning the electronic device on, turning the electronic device off, activating and/or deactivating an electronic device, increasing or decreasing a temperature setting on a thermostat, water heater, and/or pool, among other settings for electronic devices.

The method 230 can provide a more user-friendly and intuitive device voice recognition system. The method 230 can enable a user to interact with an area that includes a number of devices by describing a user intention and/or user experience instead of instructing each of the number of devices. That is, a user can give a voice command that describes a preference of the user instead of giving a voice command that gives a command to a device.

FIG. 3 illustrates a block diagram of an example of a computing device 350 in accordance with one or more embodiments of the present disclosure. The computing device 350 can be a portable computing device (e.g., hand held computing device, laptop, etc.). The computing device 350 can include a communication interface (e.g., wireless network interface controller, IEEE 802.11 adapters, etc.) for receiving wireless data from a number of wireless nodes.

The communication interface can be integrated in the computing device 350 and/or be an external card.

The computing device 350, as described herein, can also include a computer readable medium (CRM) 352 in communication with processing resources 350-1, 350-2, ..., 350-N. CRM 352 can be in communication with a device 358 (e.g., a Java® application server, among others) having processor resources 350-1, 350-2, ..., 350-N. The device 358 can be in communication with a tangible non-transitory CRM 352 storing a set of computer-readable instructions (CRI) 354 (e.g., modules) executable by one or more of the processor resources 350-1, 350-2, ..., 350-N, as described herein. The CRI 354 can also be stored in remote memory managed by a server and represent an installation package that can be downloaded, installed, and executed. The device 358 can include memory resources 352, and the processor resources 350-1, 350-2, ..., 350-N can be coupled to the memory resources 352.

Processor resources 350-1, 350-2, ..., 350-N can execute CRI 354 that can be stored on an internal or external non-transitory CRM 352. The processor resources 350-1, 350-2, ..., 350-N can execute CRI 354 to perform various functions. For example, the processor resources 350-1, 350-2, ..., 350-N can execute CRI 354 to perform a number of functions (e.g., adjusting a setting of the number of devices based on the received voice command, etc.). A non-transitory CRM (e.g., CRM 352), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 352 can also include distributed storage media. For example, the CRM 352 can be distributed among various locations.

The non-transitory CRM 352 can be integral, or communicatively coupled, to a computing device, in a wired and/or a wireless manner. For example, the non-transitory CRM 352 can be an internal memory, a portable memory, a portable disk, or a memory associated with another computing resource (e.g., enabling CRIs to be transferred and/or executed across a network such as the Internet).

The CRM 352 can be in communication with the processor resources 350-1, 350-2, ..., 350-N via a communication path 356. The communication path 356 can be local or remote to a machine (e.g., a computer) associated with the processor resources 350-1, 350-2, ..., 350-N. Examples of a local communication path 356 can include an electronic bus internal to a machine (e.g., a computer) where the CRM 352 is one of volatile, non-volatile, fixed, and/or removable storage medium in communication with the processor resources 350-1, 350-2, ..., 350-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 356 can be such that the CRM 352 is remote from the processor resources e.g., 350-1, 350-2, ..., 350-N, such as in a network relationship between the CRM 352 and the processor resources (e.g., 350-1, 350-2, ..., 350-N). That is, the communication path 356 can be a network relationship. Examples of such a network relationship can include a local area network (LAN), wide area network (WAN), personal area network (PAN), and the Internet, among others. In such examples, the CRM 352 can be associated with a first computing device and the processor resources 350-1, 350-2, ..., 350-N can be associated with a second computing device (e.g., a Java® server).

As described herein, a "module" can include computer readable instructions (e.g., CRI 354) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for device voice recognition, comprising:
   a device receiving a voice command issued to the device from a user, the voice command describing an intended action, modifying an occupancy of a premises, that the user will perform without referencing any device or a particular setting change in the language of the command;
   the device communicating the voice command to a computing device connected via a network;
   the computing device determining a first device with a first function and a second device with a second function for adjustment based on the voice command, wherein the number of devices are not capable of receiving the voice command;

the computing device converting the voice command into a first instruction to adjust a first setting of the first device and a second instruction to adjust a second setting of the second device; and adjusting the first setting and the second setting based on the intended action the user will perform described in the voice command.

2. The method of claim 1, wherein determining the first device with the first function and the second device with the second function includes determining the first device and the second device based on the intended action described in the voice command.

3. The method of claim 1, wherein adjusting the first setting of the first device and the second setting of the second device includes adjusting the first setting and the second setting based on the modification to the occupancy caused by the user performing the intended action described in the voice command.

4. The method of claim 3, wherein the first device is a different type than the second device.

5. The method of claim 1, wherein the computing device is a cloud-based offsite computing resource executing a network manager.

6. The method of claim 1, wherein adjusting the first setting and the second setting is based a number of user defined settings that correspond to the intended action described in the voice command.

7. A non-transitory computer readable medium, comprising instructions by a command receiving device to:

receive a voice command issued to the command receiving device from a user, the voice command describing an intended action, modifying an occupancy of a premises, that the user will perform without referencing any devices or a particular setting change in the language of the command;

determine, from the intended action described in the voice command, an adjustment of a first setting of a first device with a first function and an adjustment of a second setting of a second device with a second function, wherein the first device and the second device are incapable of receiving the voice command, and wherein the voice command is converted to a first instruction to the first device and a second instruction to the second device; and send the first instruction to the first device and the second instruction to the second device to perform the adjustment of the first setting and the adjustment of the second setting based on user preferences for the described intended action that the user will perform.

8. The medium of claim 7, wherein to determine the adjustment of the first setting of the first device and the adjustment of the second setting of the second device includes comparing the voice command to a number of stored adjustments to the first setting of the first device and the second setting of the second device.

9. The medium of claim 7, wherein the first device and second device are different device types.

10. The medium of claim 7, comprising instructions to analyze the received voice command and convert the received voice command to a natural language text message.

11. The medium of claim 7, wherein the voice command is received by the first device and converted to a natural language text message by the first device.

12. A system, comprising:

a computing device including instructions to:

receive a voice command issued to a command receiving device from a user, the voice command describing an intended action, modifying an occupancy of a premises, that the user will perform without referencing any devices or a particular setting change in the language of the command;

analyze the voice command and translate the voice command into a natural language text message;

determine, from the intended action described in the voice command, an adjustment of a first setting of a first device with a first function and an adjustment of a second setting of a second device with a second function based on the natural language text message, wherein the computing device is connected to the first device and the second device via a network, and wherein the first device and the second device are incapable of receiving a voice command;

convert the natural language text message into a first instruction to the first device and a second instruction to the second device; and send the first instruction to the first device and the second instruction to the second device for adjusting the first setting and the second setting based on user preferences for the described intended action that the user will perform.

13. The system of claim 12, wherein the computing device is a mobile device that is at a remote location from the first device and the second device.

14. The system of claim 13, wherein the functionality of the computing device is distributed between the computing device, the mobile device, and the first device and the second device.

15. The system of claim 12, wherein the instructions deactivate the first device and the second device.

16. The system of claim 12, wherein the computing device is in a first room of a building and the first device is in a second room of the building.

17. The system of claim 12, comprising instructions to confirm adjusting the determined setting to a user that provided the voice command.

18. The system of claim 17, wherein to confirm adjusting the determined setting includes sending a voice confirmation from the computing device.

19. The system of claim 12, wherein the computing device sends instructions to each of the first device and the second device based on the voice command.

20. The system of claim 19, wherein the instructions to each of the first device and the second device includes instructions for a different setting adjustment based on the voice command.

* * * * *